United States Patent

[11] 3,600,989

| [72] | Inventor | Jury Stepanovich Valkov |
| | | ulitsa Belinskogo, 8, kv. 5, Frunze, U.S.S.R. |
| [21] | Appl. No. | 836,044 |
| [22] | Filed | June 24, 1969 |
| [45] | Patented | Aug. 24, 1971 |

[54] METAL-CUTTING MACHINE
2 Claims, 6 Drawing Figs.

| [52] | U.S. Cl. | 82/34 |
| [51] | Int. Cl. | B23b 3/06 |
| [50] | Field of Search | 82/32, 34; 308/3.5, 5 |

[56] References Cited
UNITED STATES PATENTS

| 1,575,735 | 3/1926 | Burrell et al. | 82/32 |
| 2,542,419 | 2/1951 | Longstreet | 308/3.5 |
| 3,148,003 | 9/1964 | Deflandre | 308/3.5 |

*Primary Examiner*—Leonidas Vlachos
*Attorney*—Holman & Stern

ABSTRACT: A metal-cutting machine in which a carriage is mounted for movement along guides having a lubricating film on their working faces and telescopically parting plates serve as a protective means for the guides. The plates are assembled in groups at both sides of the carriage so that in each group, the first plates are connected with the carriage and the last plates mechanically connected with a stationary member of the machine. The carriage has passages for forced lubrication of the guides working faces and protective strips located above the plate groups and along the guides pass through slots with the coupling between the last plate of each group with the stationary member including a mechanism for periodical connection of the plates with the carriage during its movement to the extreme positions.

3,600,989

1

METAL-CUTTING MACHINE

BACKGROUND OF THE INVENTION

The present invention relates to metalworking machines and, more specifically to metal-cutting machines having guides with a lubricating film on their working faces, with the guides carrying a carriage and being protected by telescopically parting plates.

Such metal-cutting machines are known in the art and attention is directed to British Patent Specification No. 755,806. In these machines, the telescopically parting plates, placed one above the other, are mounted at both sides of the carriage so that in each group the first plates are connected to the carriage and the last plates to a stationary member of the machine.

Due to the fact that during partial or complete separation of the plates, slots are formed between the stationary member of the machine and the plates, the known design for protecting the guides does not provide for reliable protection of their working faces against the penetration of foreign particles and cooling fluid. By reason of the above disadvantages, the guides gradually loose the accuracy of their treatment and wear-resistant properties.

Another disadvantage of the known system of protection for the guides is that the connection of the last plate of each group with the stationary member of the machine does not allow the plates assembled in a pack to move beyond the limits of the bed at the extreme positions of the carriage. This, in turn, results in an increase of the length of the bed for the arrangement of the pack of plates.

The guides of the above-discussed machines have walls which project above the working face are used for forming trays filled with oil, while the working faces of the carriage are provided with longitudinal and lateral passages for supplying oil from the trays onto the working faces of the guides and carriage. The presence of the trays filled with oil is disadvantageous since upon moving the carriage at a higher speed, the oil is splashed therefrom.

An object of the present invention is to eliminate the above-mentioned disadvantages.

SUMMARY OF THE INVENTION

Another object of the invention is to provide a metal-cutting machine in which the guides effect a reliable protection against the penetration of foreign particles and cooling fluid thereon.

Still another object of the invention is to provide a machine in which the guides possess high wear-resistant properties a high accuracy of their treatment during a longer period of service as compared with known guides.

According to the above and other objects, the invention includes a metal-cutting machine having guides with working faces lubricated by an oil film, carrying a carriage and being protected by telescopically parting plates assembled in groups at both sides of the carriage so that in each group the first plates are connected with the carriage, while the last plates are mechanically coupled with a stationary member of the machine. Moreover, the carriage is provided with passages for a forced lubrication of the working faces of the guides and with slots for moving protective strips above the groups of plates and along the guides, the mechanical coupling with the last plate of the group with the stationary member of the machine being effected by means of a mechanism for periodically connecting these plates with the carriage when the carriage moves to its extreme position.

The most advantageous solution is obtained when the above mechanism comprises stops mounted on the stationary member and the carriage respectively, and a turning lever whose axle is secured to the last plate of each group periodically engages each of the stops during the movement of the carriage to the extreme positions.

2

By reason of this design, the guides feature high wear-resistant properties and maintain the high accuracy of treatment thereof during a long-term operating period.

Further objects and advantages of the invention will be more readily apparent and the invention will be better understood by reference to the following description taken in connection with the accompanying drawings wherein some embodiments of the invention are illustrated by way of example.

DETAILED DESCRIPTION OF THE INVENTION

Figure 1:
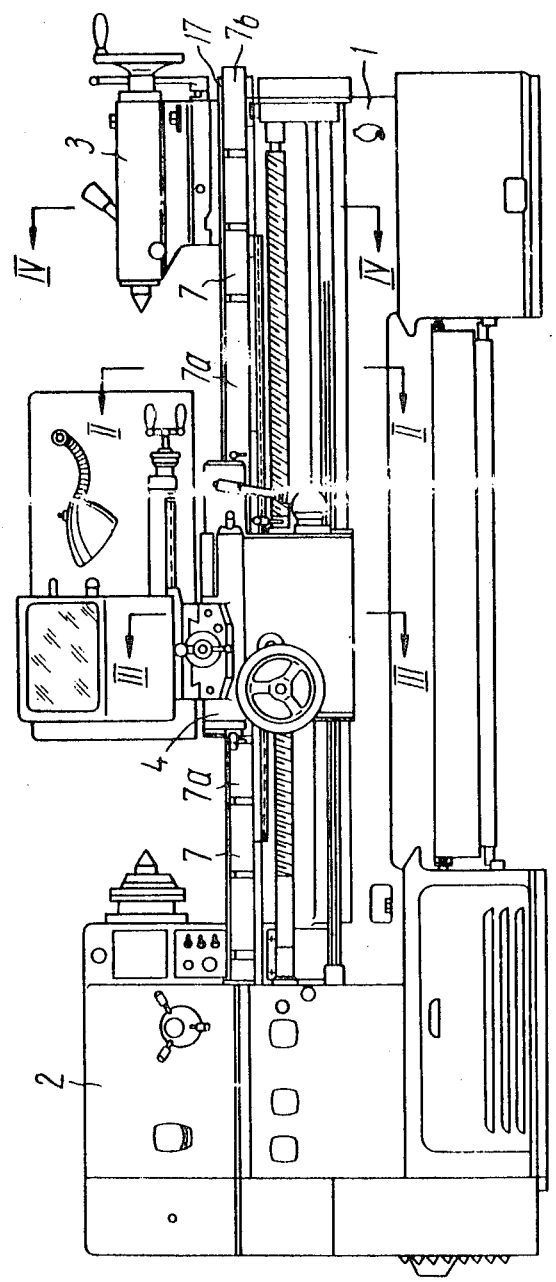
FIG. 1 is a general view in elevation of the screw-cutting machine according to the invention.

The invention is further described with respect to screw-cutting lathe whose bed (FIG. 1) is provided with a headstock 2, a tailstock 3 and a carriage 4. In order to clearly explain the essence of the invention, the following description thereof will not concern the construction and operation of the well-known units of screw-cutting machines.

The carriage 4 is mounted for movement along guides 5 and 6 (FIG. 2) of a bed 1. The guides 5 and 6 are protected by telescopically parting plates 7 and the plates 7 are assumed to have the same height. The plates are mounted in groups along the guides 5 and 6 at both sides of the carriage 4 so that in each group, the first plates 7a (FIG. 1) are connected with the carriage 4, while the last plates 7b are mechanically coupled to the bed 1 which is a stationary member of the machine. The mechanical coupling of the first plate 7b of each group with the bed 1 is effected by means of a mechanism A (FIG. 2) adapted for a periodic connection of the plates with the carriage 4 during its movement to the extreme positions.

Detailed description of the mechanism A will be given hereinafter.

Figure 3:
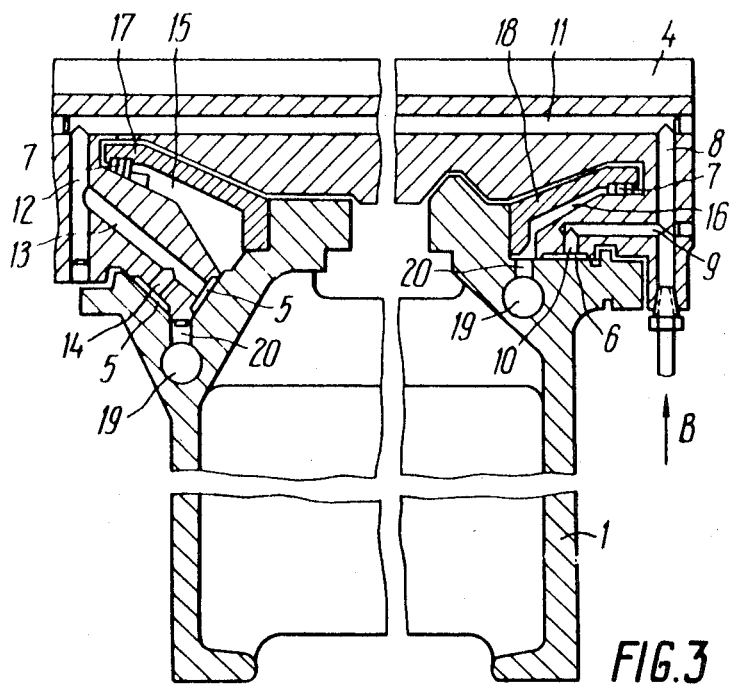
FIG. 3 is an enlarged sectional view taken along the line III—III of FIG. 1.

According to the invention, the carriage 4 is provided with passages 8—14 (FIG. 3) for a forced lubrication of the working faces of the guides 5 and 6 and with slots 15 and 16 for passing therethrough protective strips 17 and 18 respectively. The strips are mounted above the groups of plates 7 along the guides 5 and 6 and are secured to the bed 1, with the strips 17 and 18 reliably protecting the plates 7 against damage and penetration of cuttings and cooling fluid.

During the operation of the screw-cutting machine, the carriage 4 is moved along the guides 5 and 6 whose working face has a continuously applied lubricating film. The lubricant is forced (by any known method) in the direction of arrow B (FIG. 3) through the passages 8—14 and is then fed onto the working face of the guides 5 and 6. The bed 1 is provided with longitudinal channels 19, having orifices 20 for the withdrawal of the supplied lubricant.

Such a supply of the lubricant onto the working faces of the guides 5 and 6 and its withdrawal therefrom provides for a development of a stable lubricating film between the working faces of the guides 5 and 6 and the carriage. The presence of solely a lubricating film (not an oil bath as in the known machines) makes it possible to impart a higher speed of movement to the carriage.

Figure 2:
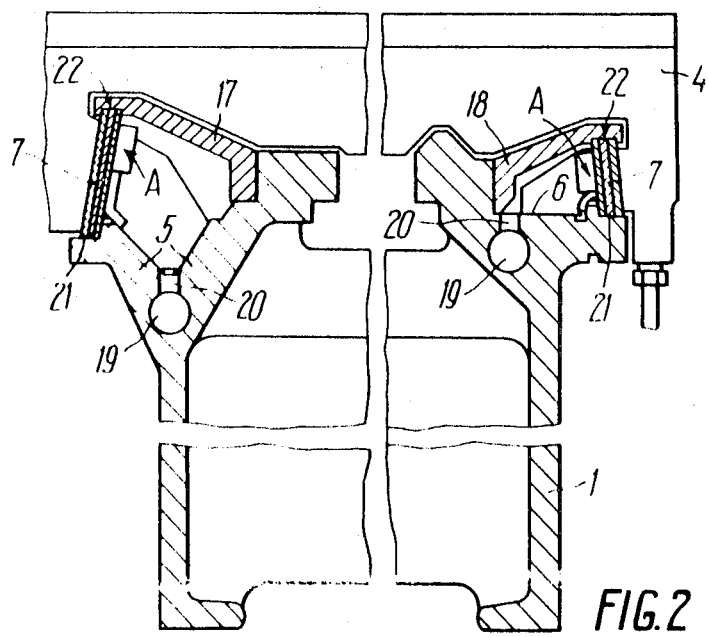
FIG. 2 is an enlarged sectional view taken along the line II—II of FIG. 1.
Figure 4:
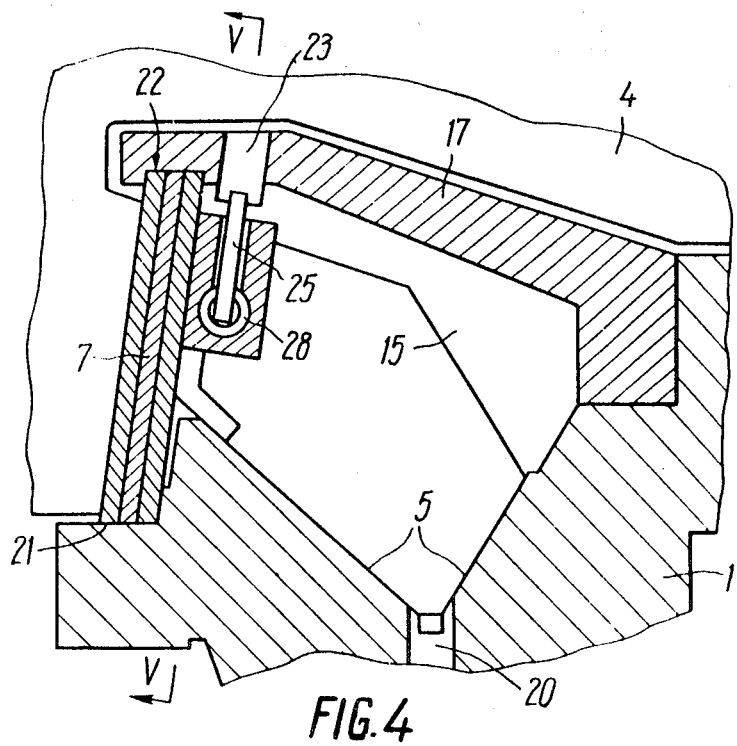
FIG. 4 is an enlarged sectional view taken along the line IV—IV, of FIG. 1 with the carriage being shown in its extreme position.
Figure 5:
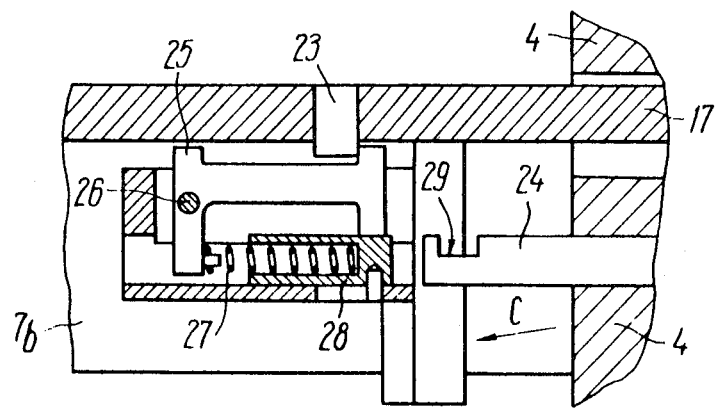
FIG. 5 is a sectional view taken along the line V—V of FIG. 4.

When the carriage 4 moves in the direction of arrow C (FIG. 5), the group of the plates 7a positioned at the left side from the carriage opens, while the group of the plates 7b positioned at the right side closes. The plates 7b resting upon flanges 21 (FIG. 4) of the bed 1 are moved along the guides 5 and 6 and in slots 22 of the protective strips 17 and 18. In this case, the last plate 7b (FIG. 5), as described above, is coupled with the stationary member of the machine, that is with the strip 17 (18), by means of the mechanism A (FIG. 2).

Figure 6:
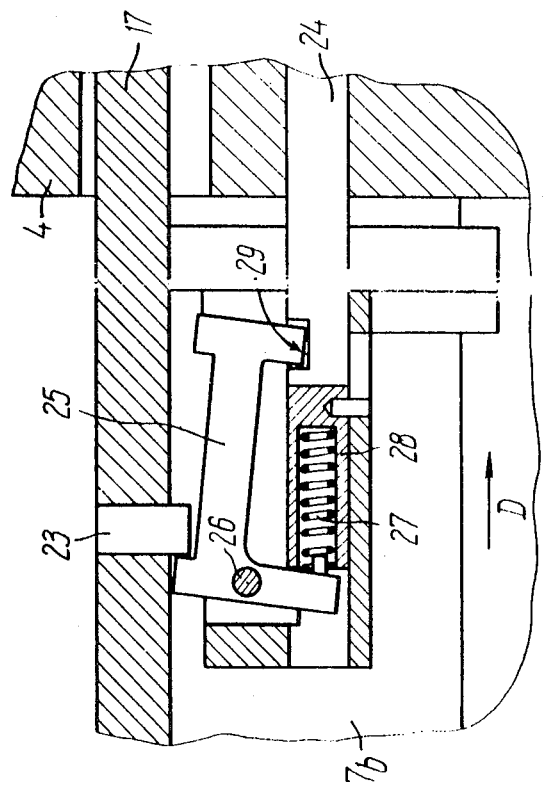
FIG. 6 is with the last plate of a view similar to FIG. 5 the group being rigidly secured to the carriage.

The mechanism A comprises stops 23 (FIG. 4) and 24 (FIGS. 5 and 6) mounted on the protective strip 17 (18) and on the carriage 4 respectively. A turning lever 25 provided with an axle 26 is secured on the plate 7b. One arm of the turning lever 25 periodically engages the stops 23 and 24, while the other art thereof is loaded with a spring 27 arranged in a cup 28 serving as a stop for fixing the position of the lever 25.

Thus, the last plate 7b, by means of the turning lever 25 engaging the stop 23, is connected with the strip 17 (18) until the carriage 4 in the course of its further movement approaches the plate 7b and its stop 24 is formed with a recess 29. Thereafter, the stop 24 (FIG. 6) acts upon the cup 28 and moves the cup. In this case, the lever 25 will turn about the axle 26 and its arm enters the recess 29 of the stop 24, i.e. the lever 25 will rigidly connect the last plate 7b with the carriage 4. During further movement of the carriage 4 to the extreme position, the plates 7, set into a pack, move therewith and pass beyond the limits of the bed.

In the course of the back movement of the carriage 4, i.e. in the direction of arrow D (FIG. 6), the plates 7, still being in a pack, move together with the carriage until the lever 25 meets the stop 23. Then, the lever 25 will turn about the axle 26 and its arm will leave the recess 29 of the stop 24, and the lever 25 will occupy the initial position, i.e. it connects the last plate 7b in the group with the protective strip 17 (18). Upon further movement of the carriage, the remaining plates 7 will open telescopically and at the same time, the other group of the plates 7 disposed at the other side of the carriage 4 will close.

Due to such a mechanical connection of the last plate 7b in the group with the stationary member of the machine through the mechanism A which is capable of periodically connecting such plate together with the entire group of the plates 7 to the carriage 4 during its movement to the extreme position, it is possible to reduce the required length of the bed so that it is possible to reduce the overall dimensions and weight of the machine.

The protection of the guides in the present machine eliminates penetration of foreign particles and cooling fluid on these guides and provides for their high wear-resistant properties and keeping the high accuracy of their treatment during a long service period.

Although the present invention has been described in its preferred embodiment with a certain degree of particularity, it will be easily understood by those skilled in the art that various changes and modifications in the details of construction and arrangement of parts may be resorted to without departing from the spirit and scope of the invention as defined in the annexed claims.

I claim:

1. A metal-cutting machine including a stationary member, guides with a lubricating film on their working faces, a carriage mounted on the guides for movement therealong, telescopically parting plates serving as a protective means for said guides, said plates being assembled in groups at both sides of said carriage so that in each group, the first plates are connected with the carriage, and the last plates mechanically connected with the stationary member, said carriage having passages for forced lubrication of the working face of said guides, protective strips mounted above said groups of plates and along said guides, slots for passing said strips and the mechanical connection of said last plate of each group with the stationary member including a mechanism for periodical disconnection from said stationary member and connection of the last plates with said carriage during its movement to the extreme positions.

2. The metal-cutting machine as claimed in Claim 1 in which said mechanism comprises stops secured to the stationary member and on the carriage respectively, and a turning lever provided with an axle secured on the last plate of each group and periodically engaging each of the stops during the movement of said carriage to the extreme positions.